Aug. 27, 1929. J. C. BRIEL 1,725,845
APPARATUS FOR PURIFYING WASTE LUBRICATING OIL
Filed Jan. 7, 1925 2 Sheets-Sheet 2
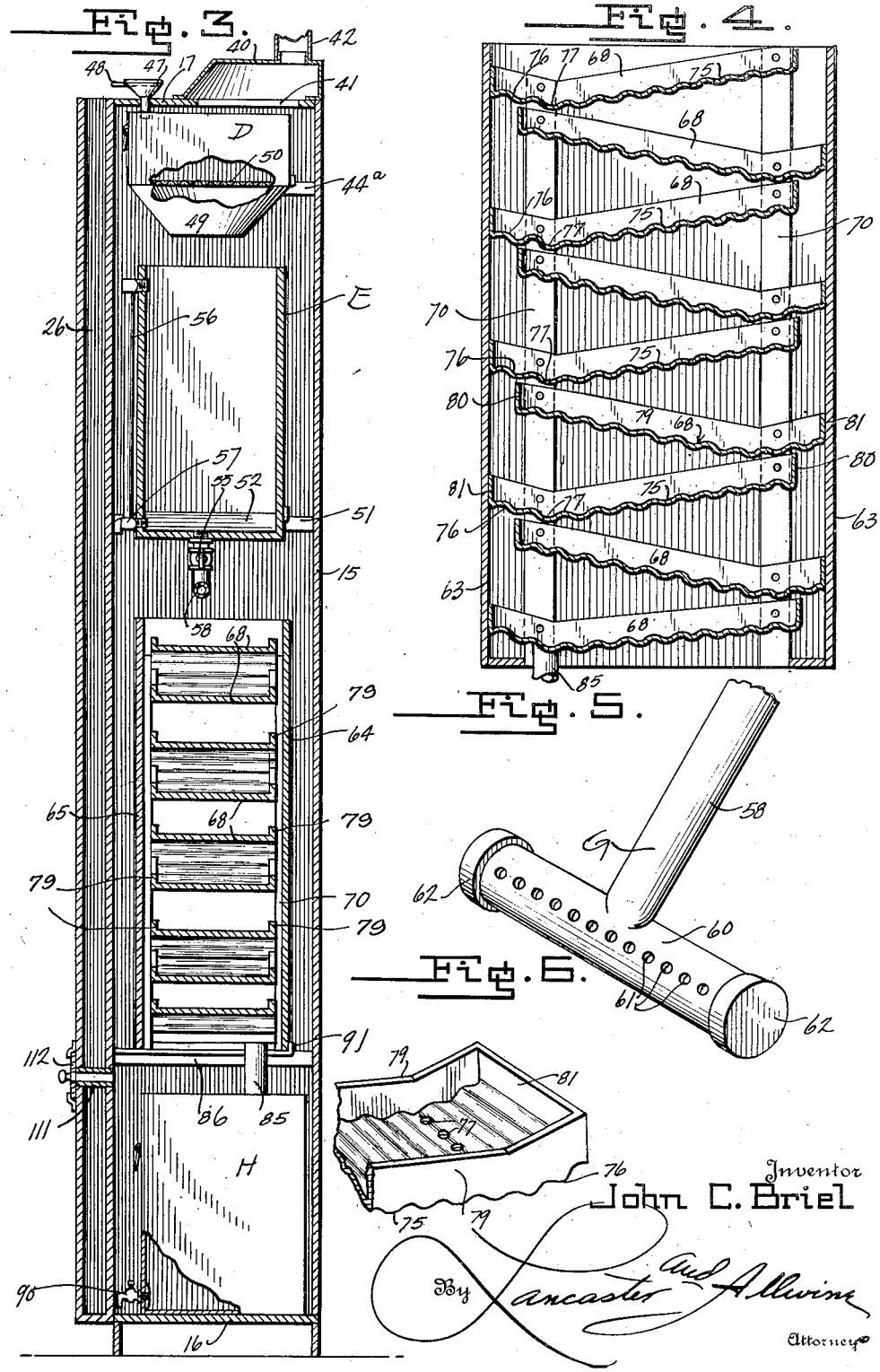
Inventor
John C. Briel Patented Aug. 27, 1929.

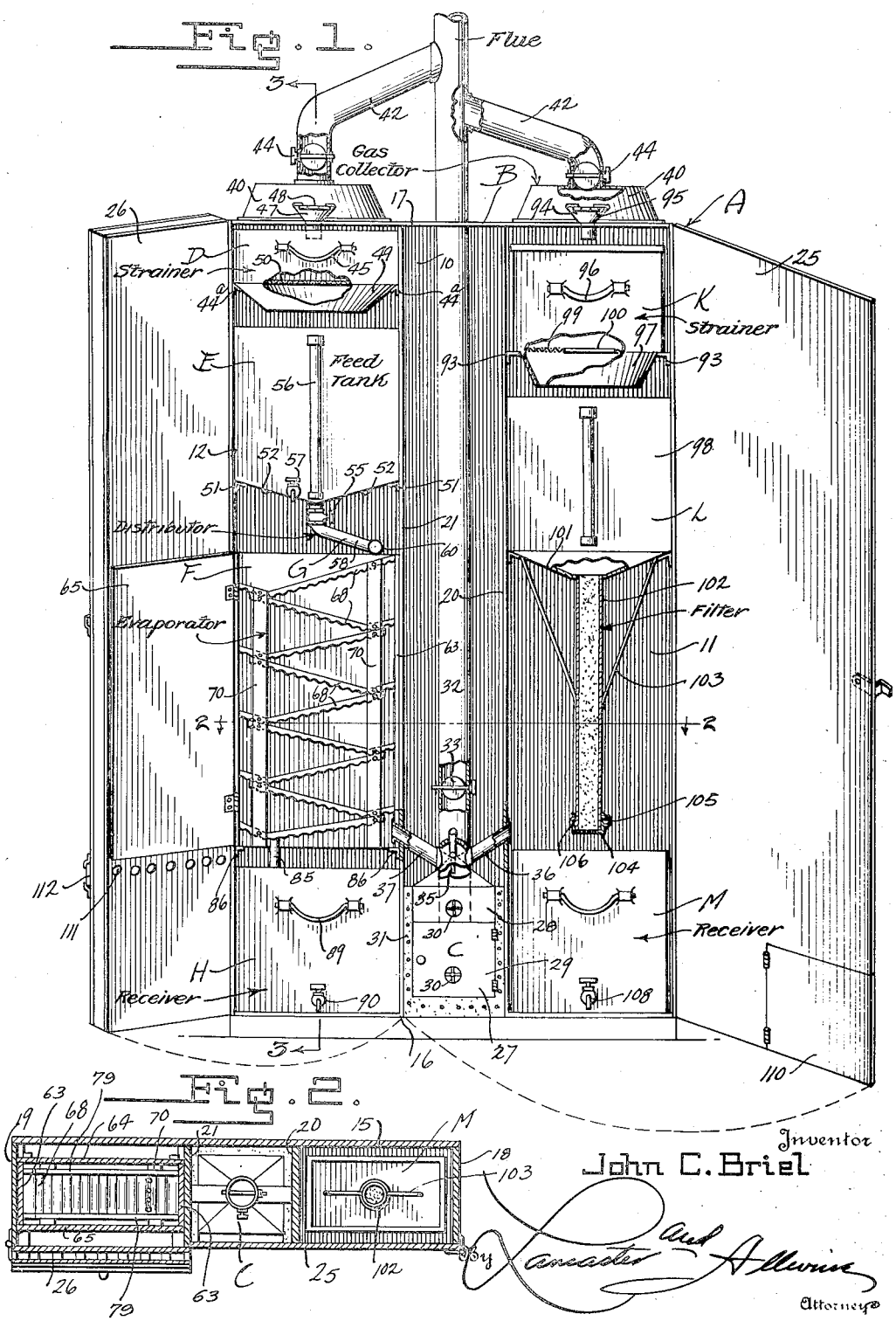

1,725,845

UNITED STATES PATENT OFFICE.

JOHN CONRAD BRIEL, OF STERLING, COLORADO.

APPARATUS FOR PURIFYING WASTE LUBRICATING OIL.

Application filed January 7, 1925. Serial No. 1,016.

This invention relates to improvements in means for purifying used or polluted lubricating oils.

The primary object of this invention is the provision of improved apparatus for the purifying of used lubricating oil, for the removal of foreign liquid and dirty matter therefrom, purifying the same to a degree which will permit of its use for lubricating purposes.

A further object of this invention is the provision of a compact apparatus for the treatment and refining of dirty and polluted lubricating oils, such as are periodically drained from the crank cases of internal combustion engines, which method and apparatus contemplates the removal of foreign fluid, such as water, gas, and kerosene therefrom, and the removal of solid or semi-solid matter therefrom.

A further object of this invention is the provision of a novel apparatus for the treatment of unclean or polluted lubricating oil, embodying a novel operating apparatus for the dissipating of foreign and volatile liquids from the lubricating oil, and also embodying novel filtering means for the removal of matter in suspension therein.

Other objects and advantages of this invention will be apparent during the course of the following detailed description.

In the accompanying drawings, forming a part of this specification, and wherein similar reference characters designate corresponding parts throughout the several views—

Figure 1 is a front elevation of the improved apparatus for the novel treatment of waste lubricating oil, showing the housing in which the apparatus is contained in an open relation to expose the various details of this invention.

Figure 2 is a cross sectional view taken through the improved apparatus substantially on the line 2—2 of Figure 1.

Figure 3 is a longitudinal cross sectional view taken through the improved apparatus, showing certain novel details thereof.

Figure 4 is an enlarged cross sectional view taken through a novel evaporator used with this invention.

Figure 5 is a perspective view of a distributor head as used for dispensing the lubricating oil into the evaporator, and Figure 6 is a perspective view of an end of one of the evaporator trays showing the novel construction thereof.

In the drawings, wherein for the purpose of illustration is shown only the preferred embodiment of this invention, the letter A may generally designate the improved apparatus for the treatment and purification of polluted lubricants, which includes a housing or casing B within which a novel heating plant C may be located. A strainer receptacle D is preferably provided for initially receiving the polluted lubricating oil, to strain large solid particles therefrom, so that the oil will drop into the feed receptacle E in a somewhat cleansed condition. From the receptacle E the oil is dispensed on the evaporator F by means of a distributor head G, and from the evaporator the oil passes into a receiving receptacle H. The oil is then dumped into a strainer receptacle K, and thence into a novel filtering construction L, and from there the purified oil passes into a receiving receptacle M, from whence it may be removed as desired.

The casing or housing B is preferably constructed of sheet metal, and is formed to provide an intermediate or heating compartment 10; and right and left compartments 11 and 12 respectively adapted to receive details of the filter and evaporating structure of this invention as will be subsequently described. The housing more specifically comprises a rear wall 15; bottom wall or support 16; top wall 17; and side walls 18 and 19. The vertical partition walls 20 and 21 are provided within the cabinet or casing subdividing the same into the vertical compartments 10, 11 and 12 above mentioned. A door or closure 25 is hingedly connected to the right hand side wall 18, and a door or closure 26 is hingedly carried by the left hand side wall 19. The closure 25 is wider than the closure 26; the latter being adapted to serve merely as a closure for the compartment 12, whereas the closure 25 serves to regulate entrance to both compartments 10 and 11.

The heating plant C may be of various types, although the same preferably is located in the lower part of the central compartment 10 directly above the bottom 16, and includes a firebox 27 above which a heater box 28 is located to receive heat therefrom. A door 29 may be provided for the firebox 27, and this door and the front wall of the heater box or compartment 28 are preferably provided with draft regulating devices 30. The firebox and heating compartment or box are preferably insulated from the walls of the casing by means of firebrick 31. A vertical flue or pipe 32 preferably extends upwardly through the compartment 10 and passes through the top wall 17. In this flue over the heater is preferably located a damper 33 as a means of regulating the draft. Lateral heat conveying pipes or conduits 36 and 37 respectively lead in an upwardly diverging relation and extend through the partitions 20 and 21 for the conveying of heated gases to the compartments 11 and 12, for the refining of the used lubricating oil therein, in accordance with this invention. The heat control valve 35 is preferably provided, being pivotally connected to the heater as means of controlling flow of heated gases into either of the flues or pipes 36 and 37. As centrally positioned, as illustrated in Figure 1, the valve 35 will permit heated gases to enter both pipes 36 and 37, although it can be swung to the right or left for closing either of the flues and opening the other. It is of course contemplated that the heated gases shall pass upwardly through the compartments 11 and 12 for heating the various units of this invention. At the top wall 17 over each of the compartments 11 and 12, a dome shaped gas collector 40 is placed, into which the gases from the compartments 11 and 12 collect through openings 41 in the top wall 17. From the collectors 40 the waste products of combustion pass through flues or branch conduits 42 to the main flue 32. The branch flues or conduits 42 adjacent the collectors 40 each have a suitable damper or control valve 44 therein, as a means of regulating the draft through the compartments 11 and 12.

The receptacle D is slidably mounted upon angle brackets 44ª carried by the walls 19 and 21 of the housing B; this receptacle having a handle 45 thereon as a means of conveniently sliding the same outwardly from the compartment 12 for the purpose of cleansing it. This receptacle has an open top, and the dirty and polluted oil is fed into it through a funnel structure 47 which is carried by the top wall 17. A slide 48 in the funnel may serve as a closure means. The bottom wall 49 of the receptacle D is of substantially funnel shaped construction, and has an outlet opening directly over the feed tank E. A strainer 50 of fine mesh wire is disposed within the receptacle D for the purpose of straining solid foreign particles from the unclean oil prior to entrance of the oil to the tank E. The tank E is slidably supported upon brackets 51 carried in the compartment 12; this tank E having an open top for receiving the lubricant from the strainer receptacle D. The tank E is preferably provided with bottom walls 52 converging toward the center of the receptacle; the distributor head G having a central connection with the feed tank E and into which the used lubricating oil flows as permitted by the valve structure 55 which is carried as a part of the distributor head G. A gauge glass 56 is preferably carried by the feed tank E as a means of letting the operator know the relative proportions of water and oil in the tank E after settlement and precipitation of the heavier fluids. After the heavier fluids have been precipitated in the tank E the same are drained from said tank by means of a pet cock 57 carried at the lower portion of the tank, and after they have all been removed from the lubricating oil the pet cock is closed and the lubricating oil is fed through the distributor head G into the evaporator F.

The distributor head G is of novel construction, and includes the coupling in which the valve 55 is disposed. The distributor G also includes the conduit portion 58 which is disposed in a downwardly sloping arrangement and at its free end is provided with a transverse nozzle or head pipe 60 provided with a series of perforations 61 therealong as a means of dispensing the oil in streams therethrough. The ends of this pipe 60 are closed by caps 62.

The evaporator structure F is novel, and includes a casing which consists of side walls 63, a rear wall 64, and a front closure or door 65. The top and the bottom of this casing are open to permit heated gases from the heater C to pass therethrough for the purpose of evaporating or distilling off the more volatile fluids, such as gasoline, kerosene, or water from the polluted lubricating oil which flows over the evaporater pans or trays. The pans or trays 68 are supported within the evaporator casing in a zig-zag relation and are held in this assembled relation by means of vertical frame pieces 70 to which said pans or trays are riveted or bolted at the sides thereof. The evaporator pans 68 are of similar formation, each of the same including a main bottom portion 75 and a minor bottom wall 76; the bottom wall at the juncture of the portions 75 and 76 having a transverse row of openings 77 therein through which the oil passes from one tray to the other. The wall portions 75 and 76 are corrugated as a means for retarding the flow of oil along the tray, and as a means of providing a maximum surface over which the oil flows for exposure to the heated gases for a maximum time to distill off the more volatile waste fluids therefrom. Each tray 68 furthermore includes the side walls 79 which extend along the sides of the bottom wall portions 75 and 76; a head wall 80 and a foot wall 81; the latter being formed at the end of the wall portion 76.

The relation of the trays as assembled upon the frame pieces 70 is important. Adjacent trays are oppositely inclined with respect to each other; the head end of the tray being uppermost with the wall portion 75 inclined in downwardly sloping relation to the horizontal, so that the openings 77 are placed at the lowermost portion of the bottom wall and the oil may pass from an uppermost tray directly into the head portion of the next lowermost tray and the oil then flows downwardly in a reverse direction to that in which it flowed for the adjacent upper wall. The oil thus passes from one tray to the other and pursues a tortuous path over the various trays or pans. The oil in flowing down each tray cannot pass over the foot wall 81 of the tray, primarily because of this foot wall 81, but also because of the fact that the wall portion 76 slightly inclines upward to the horizontal, and the easiest exit for the lubricating oil is through the openings 77 in the tray. The head walls 80 of the trays 68 are spaced from their adjacent casing wall 63 to permit passage of heated gases about the tray, and the top edges of these head walls 80 are spaced from the next upper tray a sufficient distance to permit the heated gases passing between adjacent trays for upward flow through the evaporator. Thus, the heated gases flow beneath all of the trays and heat the oil as it flows over its tortuous path, tending to dissipate the volatile constituents of the polluted oil, and which are carried in the form of vapor upwardly through the casing compartment 12 and out through the flue 42. It is to be noted that the side walls 79 of the trays do not contact the wall and closure 64 and 65, but a small space is provided between the tray side walls and the casing in which these trays are disposed; the width of this space being equivalent to the thickness of the frame pieces 70, as is apparent from Figure 3 of the drawings. The lowermost tray 68 is provided with a collecting conduit 85 therein into which the lubricating flows after being subject to the evaporating treatment, and discharges into the receiving tank H. The evaporator may be supported above the tank H by any suitable bracket 86, and it is to be noted that the closure 65 of the evaporator casing may be closed notwithstanding the open relation of the main housing door 26.

The receiving tank H preferably is detachable in the lower part of the compartment 12, having a handle 89 thereon, and being provided with a pet cock 90 for drain of contents therefrom. With respect to placement of the evaporator F in the compartment 12, it is to be noted that stops 91 have been provided to limit the inner movement of the evaporator, so that a space may be provided rearwardly of the same and adjacent the rear wall of the housing B. This is also true of the feed tank E, which is spaced from the rear wall 15 of the housing B, providing spaces forwardly and rearwardly of this feed tank E and through which the heated gases may escape on their upward journey to the compartment 12.

The oil from the receiving tank H is placed manually or pumped into the receptacle K which is slidably mounted in the upper part of the right hand compartment 11, upon suitable angle brackets 93. This receptacle has an open top, and the lubricating oil is fed thereinto through a funnel 94 which is carried by the top wall 17 of the housing B; a suitable slide 95 being provided as a closure. The receptacle K may have a handle 96 as a means of moving the same, and is preferably provided with a funnel shaped bottom 97 as a means of guiding the fluid after draining into the upper receptacle portion 98 of the filtering apparatus L. Within the receptacle K a perforate or mesh screen 99 is placed, and is preferably centrally provided with an imperforate disc 100 so that the oil of necessity has to pass through the strainer 99 outwardly of the edges of the imperforate disc 100, so that the lubricating oil may drop into the receptacle portion 98 of the strainer L and fall upon the converging side walls 101 of the filter receptacle 98, thus being prevented from falling directly into the filter tube 102 provided in depending relation on the filter receptacle 98.

The oil after being strained in the receptacle K drops into the filter receptacle 98 upon the hopper shaped bottom wall 101, and from thence flows into the vertical cylindrical shaped tube 102 which is preferably filled with some filtering substance such as fuller's earth. This tube may be held in a braced relation by means of rods 103. At its lower end the filter tube pivotally supports a perforate cap 104, swingable upon an axis 105. The opposite side has a latch 106 for holding it closed. The cap is perforate so that the filtering material will be held in the tube 102, but the oil is permitted to filter therethrough and drop into the receiving tank M; the latter being provided with a pet cock 108 for discharge of the filtered contents thereof. The purified lubricating oil after being discharged from the filter L is in good condition to be used for ordinary lubricating purposes.

The doors 25 and 26 of the housing B are normally closed during operation of the oil purifying apparatus, and access to the firebox may be had through a relatively small door 110 hingedly connected to the lower outer corner of the main closure 25, and which in fact forms a part of said closure 25, as can be seen in Figure 1 of the drawings. In order to insulate the compartment 12 the door 26 is preferably double walled, and transverse draft carrying tubes 111 may extend therethrough as a means of carrying air from outside into the compartment 12 when the door 26 is closed. A slide 112 regulated from exterior of the door 26 is provided to control the flow of fresh air through the tubes 111.

From the foregoing description of this invention it is apparent that a novel apparatus for the filtering and reclaiming of dirty lubricating oils has been provided, which will quickly, conveniently, and economically purify the oils so as to render them suitable for ordinary lubricating purposes. The degree of heat which passes through the compartments 11 and 12 is of course regulated by means of the valve 35, and some heat in the compartment 11 is essential to render the lubricating oil less viscid and so that it will easily pass through the filter material. The various strainers of this invention are not effective enough in themselves to remove particles of solid material which are in suspension in the body of oil, such as carbon and finely divided metal which may be dispersed in the oil; the same being the washings from the bearings of an engine. However, this solid material is readily strained from the oil during passage through the filter L.

Various changes in the shape, size, and arrangement of parts may be made to the form of invention herein shown and described, without departing from the spirit of this invention or the scope of the claims.

I claim:

1. An apparatus for purification of waste lubricating oil, comprising a housing subdivided into oil evaporating and oil filtering compartments, means for selectively directing heated gases through said compartments, a strainer mounted in said oil evaporating compartment for primarily receiving the waste lubricating oil, an evaporator in said oil evaporating compartment below said strainer, a distributing means for receiving oil from said strainer for flowing the same in thinly flowing streams over the evaporator, and filtering means in the oil filtering compartment for receiving the oil after treatment through said evaporator.

2. An apparatus for purification of used lubricating oil, comprising a casing subdivided into intermediate and side oil evaporating and oil filtering compartments, a heater in said intermediate compartment, a flue for said heater, heating conduits leading from said heater into said side compartments, means for selectively controlling the flow of heated gases through said side compartments, evaporating means in the side oil evaporating compartment, means for dispensing finely divided oil streams on to said evaporator for the volatilization of polluting liquids from said oil, and filtering means in the side filtering compartment adapted to receive the oil after passing through said evaporator.

3. In an oil purifier the combination of a casing, partition walls within the casing dividing the same into substantially vertical side oil evaporating and oil filtering compartments and an intermediate compartment, a heater in the lower end of the intermediate compartment, means for directing heat from the heater in selective manner into either or both of the side compartments, a vertical flue extending from the heater upwardly through the intermediate compartment to exteriorly of the casing, gas collecting domes on the casing at the tops of the side compartments for collecting gases and vapors from said side compartments, conduits leading from said gas collecting domes to the flue and in communication therewith, an oil evaporator in the side oil evaporator compartment, and an oil filter in the side oil filter compartment.

4. An apparatus for purifying waste lubricating oil, comprising a casing divided into side oil evaporating and oil filtering compartments and an intermediate compartment, a waste lubricating oil receiving tank disposed in the upper end of the oil evaporating compartment, an evaporator disposed below said tank in the oil evaporating compartment for receiving the waste oil therefrom, a heater disposed in the intermediate compartment, means for heating air about said evaporator by said heater, a filter disposed in the side oil filtering compartment for receiving oil from the evaporator, and means for heating the last mentioned compartment from said heater.

JOHN CONRAD BRIEL.